United States Patent Office 3,281,397
Patented Oct. 25, 1966

3,281,397
POLYURETHANE-UREAS CONTAINING UREA-LINKED PIPERAZINE COMPOUNDS
Seymour L. Axelrod, Trenton, Mich., assignor to Wyandotte Chemicals Corporation, Wyandotte, Mich., a corporation of Michigan
No Drawing. Original application Jan. 26, 1959, Ser. No. 788,795. Divided and this application Feb. 10, 1964, Ser. No. 343,464
1 Claim. (Cl. 260—77.5)

The present invention relates to new and useful polyurethane-urea polymers and is more particularly concerned with polyurethane-urea polymers containing heterocyclic-urea-linked chain structure. More specifically, the present invention relates to polyurethane-urea polymers incorporating urea-linked piperazine compounds, which are prepared by the chain-extension of isocyanate-terminated polyurethanes, and to a method of producing said urea-linked piperazine-modified polyurethanes.

This is a division of copending application Serial No. 788,795, filed January 26, 1959, now abandoned.

The chemistry and technology of polyurethanes has made great strides since the early work of Otto Bayer reported in Angewandte Chemie A 59, 257 (Sept. 1947). Much of this later work has been summarized in the report of A. C. Beutel et al. entitled "Polyurethanes," published in 1956 by Polyurethane Associates, Cambridge, Massachusetts; in the B. A. Dombrow monograph entitled "Polyurethanes" published in 1957 by Reinhold Publishing Corporation, New York; and in the Kirk-Othmer "Encyclopedia of Chemical Technology," First Supplement Volume, under the heading "Urethane Polymers." Numerous patents issued in recent years also give evidence of tremendous activity in this art.

Among the noteworthy advances in this area may be mentioned the production of polyurethane-urea polymers of elastomeric or plastic nature by the chain-extension of isocyanate-terminated polyurethane polymers by reaction with water, thereby converting isocyanate groups to amine groups which then react with other isocyanate groups to form urea linkages. Diamines have also been reacted directly with isocyanate-terminated polyurethanes for purposes of chain extension through formation of urea linkages. The diamines produced by hydrolysis of isocyanates and likewise added as such to isocyanate-terminated polyurethanes have notably been primary diamines, such as tolylene diamine, an arylene diamine, and the like. Alkylene and cycloalkylene diamines have also been proposed as chain extenders of polyurethane polymers for purposes of producing elastomeric or plastic products.

These prior art polyurethane-urea polymers produced by chain extension using primary diamines are generally characterized by difficulty of processing on conventional rubber equipment, difficulty of processing to obtain useful values of tensile strength through vulcanization unless unsaturation has been built into the molecule, and are frequently highly colored. At utilizable tensile strength values, such products have been extremely difficult to process, due to the accompanying high degree of hardness. One factor to which such hardness can be attributed is the presence of two hydrogen atoms on each of the two diamine nitrogens which, upon reaction with an isocyanate-terminated polyurethane, produces a urea linkage in which each nitrogen atom bears a hydrogen atom which, being active, is replaceable by an isocyanate radical in the classic biuret formation reaction to form a urea linkage which is quadruplicately cross-linked, thus:

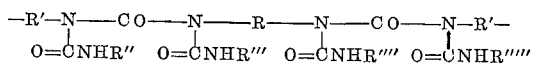

wherein R is the primary diamine residue and R' is the isocyanate-terminated polyurethane residue, and wherein R″, R‴, R″″, and R‴″ are the residues of isocyanates or isocyanate-terminated polymer chains. Another and more likely explanation for difficulty in processing of such polymers prepared from primary diamines is the formation of hydrogen bonds due to the extra active hydrogen atoms on the urea nitrogens.

While a multi-dimensional lattice structure is in theory highly desirable and even necessary for elastomeric qualities, an excess of active hydrogens and corresponding increased crosslinking or hydrogen-bonding is without question at least partially responsible for the hardness to tensile strength ratio above-mentioned and its attendant difficulties in processing, etc.

It has likewise been proposed to incorporate piperazine compounds into polyurethane molecules, such as by the reaction of piperazine or alkyl-substituted piperazines with alkylene and arylene dihydric alcohols, such as ethylene glycol, cyclohexanediol, or diphenylolpropane, in the form of their bis-chloroformates for purposes of making polyurethanes for films and fibres. In these polyurethane molecules, the piperazine compounds have invariably been bound in urethane linkages and these were invariably of the formula

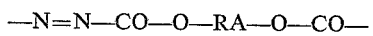

where the N atoms are a part of the piperazine ring and RA represents the alcohol residue. These polyurethanes, as will be noted, have no possible cross-linking centers for establishment of tri-dimensional lattice-type molecules and, in fact, are even devoid of active hydrogen atoms attached to the N atom of the urethane linkage, and thus would be completely incapable of setting up cross linkages or branches, even through allophanate production or hydrogen-bonding, if such concepts were suggested. Of course, isocyanates were not present in the reaction productive of such prior art piperazine-containing polyurethanes, an entirely different process approach having been employed. In addition, no urea linkages are present in these molecules, so that biuret cross-linking or branching would be likewise impossible. These piperazine polyurethanes are, therefore, entirely unsuited for use as elastomers and were never intended as such.

So far as I am aware, piperazines have never been employed or suggested as chain extenders for polyurethane polymers, nor has it been suggested to incorporate urea-linked piperazines into such polyurethane-urea molecules, or that any advantage would be realized from so doing.

It has now been found that piperazine compounds containing only those two active hydrogen atoms attached to the two nitrogen atoms of the piperazine ring and being otherwise devoid of reactive groups, for example, piperazine compounds of the formula:

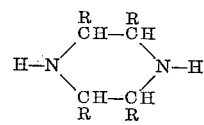

wherein R is selected from hydrogen and lower-alkyl, especially methyl, may be incorporated in polyurethane-urea polymers by the reaction thereof with isocyanate-terminated polyurethane polymers to give new and valuable polyurethane-urea polymers characterized by urea-linked heterocyclic intermediate and terminal chain structure.

Representative piperazine compounds which may be employed are, for example, piperazine itself, but preferably the C-substituted lower-alkyl piperazines, such as 2- methylpiperazine, 2-ethylpiperazine, 2-butylpiperazine, 2-hexylpiperazine, 2,5 - dimethylpiperazine, 2,6 - dimethylpiperazine, 2,3-dimethylpiperazine, and 2,3,5,6-tetramethylpiperazine. Of the piperazines which exist in stereoisomeric forms, such as 2,5-dimethylpiperazine, the cis form is preferred for processability and the trans form as lending superior tensile characteristics to the polyurethane-urea polymers incorporating same. In addition, compounds wherein a plurality of methyl or other alkyl groups are attached to a single carbon atom, such as 2,2-dimethylpiperazine or 2,2,5,5-tetramethylpiperazine, may be employed.

In contrast to the foregoing representations of the more or less successful attempts of the prior art to obtain a solution to some of the aforementioned problems, the recurring piperazine-containing urea linkages formed in accord with the present invention are of the general formula:

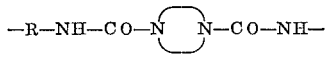

wherein the

indicates the nitrogen atoms of the piperazine ring, said ring being devoid of reactive groups. These linkages, it will be noted, contain in each case two active centers for cross linking, the two active urea hydrogen atoms for biuret formation or hydrogen-bonding.

These piperazine-containing urea linkages, to attain desirable properties, should occur at least once for every 8000 molecular weight units of the polyurethane-urea product. There may be considerably more than one of these linkages for every 8000 molecular weight units of the polyurethane-urea polymer but, on the average, it is preferred to have not more than one of these linkages for every 700 molecular weight units of product.

In its simplest form, such exemplary polyurethane-urea polymer molecule radicals may be represented as follows:

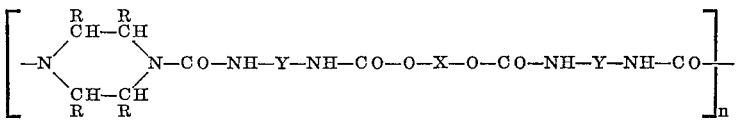

wherein $n$ is an integer, preferably a large whole number, wherein —O—X—O— is the radical obtained by removing the terminal hydrogen atoms of a polymeric glycol and Y is the organic radical of the polyisocyanate employed in producing the polyurethane. It will be noted that only four active hydrogens exist in this radical, two urea hydrogens for biuret formation and two urethane hydrogens for allophanate formation, compared to six in the usual polyurethane-urea recurring molecular unit.

These urea-linked piperazine modified polyurethanes of the present invention have been found to exhibit superior properties, especially in the elastomer area, together with a desirable light-color. For example, they have an improved ratio of tensile strength to hardness, which enables them to be more readily processed in a comparatively softer state and at higher tensile strength values. Moreover, due to this improved ratio of tensile strength to hardness, many of the new polyurethane-ureas may be utilized per se as elastomers without further processing inasmuch as they exhibit tensile strength values in excess of 2000 p.s.i. Since these tensile strength values are attained at corresponding Shore A hardness values of sixty or below, they are processable within a useful tensile strength range. In contrast, comparisons with primary diamine extended polyether type polyurethanes have shown that these do not attain useful values of tensile strength within the range of processabiliy, viz., at a hardness value below Shore A 60. Many of the elastomers of the present invention, especially those incorporating the 2-methylpiperazines and the 2,5-dimethylpiperazines (both the mixture of isomers and the individual cis and trans isomers), attain useful tensile strength values within a ready processability range and therefore need not undergo vulcanization to attain utilizability. The product of Example 4, for instance, exhibits very outstanding properties for an unvulcanized elastomer and the product of Example 3 is representative of a utilizable plastic in accord with the present invention.

The piperazine-containing polyurethane-ureas, moreover, exhibit superior characteristics when compared with polyol, e.g., butanediol, cross-linked polyurethanes. Since this use of polyols is a common practice for the chain extension and cross-linking of polyurethanes, the superiority in regard to both polyether and polyester-based polyurethanes is obviously of interest from more than a mere technical standpoint.

It is accordingly an object of the present invention to provide new and useful polyurethane-urea polymers incorporating urea-linked piperazine compounds and a method of producing same. It is a further object of the invention to provide new and useful elastomeric to plastic urea-linked piperazine-modified polyurethane-ureas. Still a further object of the invention is to provide such novel urea-linked piperazine-modified polyurethane-ureas having in general a lighter color and an improved ratio of tensile strength to hardness. An additional object is the provision of such urea-linked piperazine-modified polyurethane-ureas which are comparatively softer and therefore more readily processable at higher values of tensile strength. Still a further object is the provision of such-type polyurethane-ureas which are processable and utilizable per se as elastomers at tensile strength values in excess of 2000 p.s.i. and at corresponding Shore A hardness values not substantially exceeding a value of sixty. Other objects of the invention will become apparent hereinafter.

In brief, the urea-linked piperazine-containing polyurethane-urea polymers of the present invention are prepared by reacting the selected piperazine compound (II) with the selected isocyanate-terminated polyurethane polymer (I) according to either solvent, bulk, or emulsion technique, as more fully set forth hereinafter. The polyurethane prepolymer (I) is preparable from a large number of polymeric glycols (a) and polyisocyanates (b), also as more fully set forth hereinafter. The emulsion technique of chain extension is preferred from the point of more uniform homogeneity of reaction product.

*Polyurethane prepolymer—Starting materials*

The isocyanate-terminated polyurethane prepolymers (I) employed as starting materials according to the present invention may be any such type compound having a molecular weight in excess of about 500 which may be obtained by the reaction of a selected polymeric glycol (a), having an average molecular weight of at least 250, with a stoichiometric excess of an organic polyisocyanate (b). Such prepolymers are capable of a molecular weight increase through chain-extension with the particular chain-extension agents of the present invention.

The polyurethane polymers which may be extended according to this invention include those which are prepared from polyalkylene ether glycols and diisocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$, in which R stands for an alkylene radical and $n$ is an integer sufficiently large that the molecular weight of the compound is at least 250, i.e., large enough that the polyoxyalkylene group $-(RO)_n-$ has a formula weight of at least 232. Not all of the alkylene radicals present need to be the same. Glycols containing a mixture of radicals, as in the compound $$HO(CH_2OC_2H_4O)_nH$$

or $$HO(C_2H_4O)_n(C_3H_6O)_m(C_2H_4O)_nH$$

wherein $n$ and $m$ are together sufficient for attainment of the desired molecular weight, can be used.

These glycols are either viscous liquids or waxy solids. To be of value in preparing polymers according to this invention, the molecular weight of the glycol should be at least 250 and may be as high as 10,000. It is preferably between 400 and 4000. Polytetramethylene ether glycols, also known as polybutylene ether glycols, may be employed. Polyethylene ether polypropylene ether glycols, having the above-indicated formula, are among the preferred glycols. Polyethylene ether glycols, poly-1,2-propylene ether glycols, polydecamethylene ether glycols, and poly-1,2-dimethylethylene ether glycols are representative of other operative compounds.

The preferred polymeric glycols (a) are polyoxyalkylene glycols, e.g., polyoxypropylene or polyoxybutylene glycols, of molecular weights between about 400 and 4000, preferably 400 to 2500 for polyoxypropylene glycols and 750 to 4000 for the polyoxybutylene glycols, as well as the polyoxyethylenepolyoxypropylene glycols of molecular weight between about 1000 and 5000, preferably 1000 to 2000.

Characteristics of representative preferred polyalkylene or polyalkylene ether glycols, including hydroxyl numbers and molecular weights, are found in Table A.

TABLE A.—TYPICAL PROPERTIES OF REPRESENTATIVE PREFERRED POLYALKYLENEETHER GLYCOLS

| Glycol | Percent Polyoxyethylene | M. Wt. of Polyoxypropylene Base | Hydroxyl Number | Molecular Wt. |
|---|---|---|---|---|
| Polyoxyethylenepolyoxypropylene glycols: | | | | |
| L31 | 15 | 940 | 102.3 | 1,065 |
| L61 | 15 | 1,750 | 56.1 | 2,000 |
| L81 | 15 | 2,250 | 41.7 | 2,690 |
| P75 | 50 | 2,050 | 27.3 | 4,120 |
| F77 | 70 | 2,050 | 16.6 | 6,760 |
| F88 | 80 | 2,250 | 11.2 | 10,000 |
| Polyoxypropylene glycols: | | | | |
| PPG 400 | 0 | | 261.5 | 429 |
| PPG 765 | 0 | | 145.0 | 765 |
| PPG 1000 | 0 | | 112.0 | 1,000 |
| PPG 2000 | 0 | | 56.4 | 1,995 |

Any of a wide variety of organic polyisocyanates (b) may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate (usually about 80/20), 4,4'-methylene-bis(phenylisocyanate), and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate, and alicyclic compounds, such as 1,2- and 1,4-cyclohexylene diisocyanates and 4,4'-methylene-bis(cyclohexylisocyanate) are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which two isocyanate groups differ in reactivity are particularly desirable. The diisocyanates may contain other substituents, although those which are free from reactive groups other than the two isocyanate groups are ordinarily preferred. In the case of the aromatic compounds the isocyanate groups may be attached either to the same or to different rings. Additional polyisocyanates which may be employed, for example, include: p,p'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as the bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with a,a'-dibromo-p-xylene in the presence of alkali. In such products, the cyclic groups inserted in the polyether chain are preferably phenylene, naphthylene or cyclohexylene radicals or these radicals containing alkyl or alkylene substituents, as in the tolylene, phenylethylene or xylylene radicals. Elastomers made using polyalkylene-arylene or polyalkylene-cycloalkylene ether glycols have improved freeze resistance as compared with the corresponding elastomers containing no cyclic radicals.

Another class of glycols useful in making polyurethanes extensible according to this invention are the polyalkylene ether-polythioether glycols. Such glycols may be represented by the formula $HO(QY)_nH$ in which Q represents hydrocarbon radicals, at least some of which are alkylene, Y represents chalcogen atoms, some of which are sulfur and the rest oxygen, and $n$ is an integer large enough so that the glycol has a molecular weight of at least 250. These products may be made by condensing together glycols and thioglycols in the presence of a catalyst such as p-toluenesulfonic acid. As will be noted, these compounds resemble the polyalkylene ether glycols except that some of the alkylene radicals are joined by sulfur rather than oxygen. In each case, however, the compounds have terminal hydroxy groups which take part in the reaction with the organic polyisocyanate.

Also included in the polyurethane products which may be extended according to this invention are those made from a high molecular weight, substantially linear polyester and an organic diisocyanate of the type previously described. Products of this sort are described in the aforementioned Bayer article in Angewandte Chemie, and in U.S. Patents 2,621,166, 2,625,531 and 2,625,532. The polyesters should have molecular weights of at least 750 and are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, 1,6-hexylene glycol, and decamethylene glycol, and dicarboxylic acids such as malonic, maleic, succinic, adipic, pimelic, sebacic, oxalic, phthalic, terephthalic, hexahydroterephthalic, and para-phenylenediacetic acids, decamethylene dicarboxylic acid, and the like. Another useful group of compounds for this purpose are polyester amides having terminal hydroxy groups. The preferred polyesters may be represented by the formula $$HO(Z-OOC-Z'-COO)_nZOH$$

in which Z and Z' are hydrocarbon radicals derived from the glycol and dicarboxylic acid respectively and $n$ is an integer large enough so that the molecular weight of the compounds as a whole is at least 750 and that the polyester group $-(Z-OOC-Z'-COO)_nZO-$ has a molecular formula weight of at least 732. Preferably such polyesters have a molecular weight in excess of 1000. The polyester resulting from reaction of adipic acid with a mixture of ethylene and propylene glycols is preferred. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate to give isocyanate-terminated polyurethanes for use as starting materials in the present invention. The starting polyurethane glycol is prepared by reacting a molar excess of a polymeric glycol, such as a polyalkylene ether glycol, with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Patent 2,861,981, namely, those prepared from a polyisocyanate and the reaction product of an ester of an organic carboxylic acid with an excess of a saturated aliphatic glycol having only carbon atoms in its chain and a total of eight to fourteen carbon atoms, at least one two-carbon-atom branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula

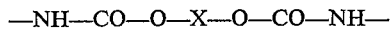

—NH—CO—O—X—O—CO—NH— wherein the bivalent radical —O—X—O— is obtained by removing the terminal hydrogen atoms of a polymeric glycol, said glycol having a molecular weight of at least 250 and being selected from the group consisting of polyalkyleneether glycols, polyurethane glycols, polyalkylene-aryleneether glycols, polyalkylene-cycloalkyleneether glycols, polyalkyleneether-polythioether glycols, polyester amide glycols and polyester glycols of the formula

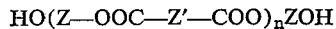

HO(Z—OOC—Z'—COO)$_n$ZOH wherein Z and Z' are hydrocarbon radicals and $n$ is an integer, and that a typical isocyanate-terminted polyurethane polymer produced from diisocyanates and dihydric glycols will on an average contain, at a 2/1 NCO/OH ratio, a plurality of intralinear molecules conforming to the formula

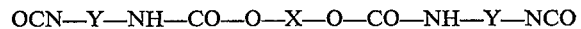

OCN—Y—NH—CO—O—X—O—CO—NH—Y—NCO wherein —O—X—O— has the value given previously and Y is the polyisocyanate hydrocarbon radical.

*Polyurethane prepolymer—Preparation*

In the preparation of the starting polyurethane polymer (I), an excess of the organic polyisocyanate (b) over the polymeric glycol (a) is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the glycol will be at least one to one, and may be up to a 3 to 1 equivalent ratio. The glycol and the isocyanate are ordinarily reacted by heating with agitation at a temperature of 50° to 130° centigrade, preferably 70° to 120° centigrade. The equivalent ratio of organic polyisocyanate compound (b) to polymeric glycol (a) is usually and preferably between about 1.3:1 and 2.0:1.

The reaction is preferably, but not necessarily, effected in the absence of a solvent, when the prepolymer (I) is a fluid at processing temperatures. When it is not, or when it is desired to employ a solvent, convenient solvents are organic solvents having a boiling range above 90° centigrade when the reaction is to be carried out in open equipment. Lower boiling solvents may of course be used where the reaction is carried out in closed equipment to prevent boiling off the solvent at the temperatures of the reaction. Solvents boiling at substantially more than 140° centigrade are difficult to remove from a fiinal chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer stage, or after cooling of the formed prepolymer. The solvents to be used are preferably those in which the reactants have some solubility but in which the final chain-extended elastomer is insoluble. Ketones, tertiary alcohols and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Toluene and isopropylacetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution, if an emulsion technique is to be employed in the chain extension; sometimes the excess solvent is useful and is allowed to remain during the emulsification stage.

The reactants are cooked for a period sufficient to react most, if not all, of the hydroxy groups, whereafter the prepolymer is allowed to stand and the free NCO content determined.

Usual pHs are employed during preparation of the prepolymer, the reaction preferably being maintained substantially neutral. Bases accelerate the reaction, acids retard the reaction, and preferably neither are added.

*Chain extension—Procedure*

In the solvent chain-extension process, the chain-extending agent is added to the isocyanate-terminated polyurethane prepolymer reaction medium and mixing continued, with or without further application of heat. During this period the molecular weight of the polyurethane reaction product increases and the mass forms a gel or, in some cases, rubbery chunks. It is then removed from the mixer and molded into sheets, for example, it may be sheeted out on a rubber mill. In some cases, a solution can be formed which may be cast into a film or used for coatings or adhesives.

In producing elastomeric polyurethane-urea latices of the present invention by the emulsion chain extension technique, the equivalent ratio of the organic polyisocyanate (b) and the polymeric glycol (a) is in most cases preferably maintained at from about 1.3:1 to 2.0:1. When using these equivalent ratios an initial polyurethane reaction product (I) is obtained which is usually a liquid under processing conditions, which, as illustrated by the examples hereinafter given, can be emulsified directly in an aqueous bath or can first be diluted with inert organic solvents, such as previously mentioned, and then emulsified in an aqueous bath. Where polyalkylene ether glycols are used in this process, molar ratios of organic diisocyanate to polyalkylene ether glycol higher than about 3:1 usually yield final polyurethane-urea polymers or mixtures of polymers which are more plastic than elastomeric. Similarly, polyalkylene ether glycols of lower molecular weight, or use of polyisocyanates having more than two NCO groups, also tend to yield polyurethane-urea polymers of a more plastic character.

The amount of piperazine compound (II) used in the chain extension step is such that from 0.5 to 1.5 equivalents of (II) are present in the chain extension reaction for each equivalent of the isocyanate-terminated polyurethane starting polymer) (I), preferably about 1.0 equivalent of (II) for each equivalent of (I). The higher ranges ensure mainly terminal piperazine groups through provision of enough of reactant (II) to react with all of the isocyanate radicals present, although for solvent technique the higher ranges are not ordinarily recommended. For a diisocyanate-dihydric polyalkylene glycol or similar polyurethane, the ratio will usually be one mole of piperazine compound (II) for each mole of isocyanate-terminated polyurethane.

According to the emulsion technique, elastomeric polyurethane-urea latices are produced by reacting the polymeric glycol compound (a) with a stoichiometric excess of an organic diisocyanate (b) and, while the reaction product (I) is in the form of a syrupy liquid, emulsifying it in water or an aqueous solution of the water-soluble or partially water-soluble chain extending agents of the present invention, preferably with vigorous agitation in the presence of an emulsifying agent. Where the initial reaction product (I) is too thick or viscous to emulsify properly in water, it can be diluted with an inert solvent and the resulting solution emulsified in the aqueous bath. If the chain-extending agent is water-insoluble, it can be added in the form of a solvent solution thereof. The emulsifying agent may be added either to the initial reaction product or to the aqueous medium in which the reaction product is to be emulsified, or may be formed in situ during addition of the reaction product to the said medium.

The piperazine chain-extending agents of this invention (II), which are water-soluble, may be used in the form of solutions in producing these emulsions or latices since they react more readily with the isocyanate-terminated polyurethane (I) than does water itself. For the same reason, the prepolymer (I) may be emulsified in water just prior to adding the chain-extending agent. The hydrogen on each end of the piperazine molecule reacts preferentially with the free isocyanate groups remaining in the initial polyurethane reaction product much more readily than does the hydrogen of the water, and therefore the chain is extended by reaction with the piperazine compound even though the reaction takes place in an aqueous medium. The amount of piperazine ordinarily employed will be that equivalent to the unreacted isocyanate groups remaining in the initial polyurethane reaction product, any excess being removed by washing with water. (The maximum degree of chain extension is theoretically obtained when there are present stoichiometric proportions of the diisocyanate-terminated polymer and the chain-extending agent.) It will be obvious, however, that somewhat lesser amounts may be employed, for the chain extension of the isocyanate-terminated polyurethane can be allowed to be completed with the water in which the piperazine is dissolved. In emulsion polymerization, excess diamine may be used without much affecting molecular weight, since the diamine enters the dispersion of prepolymer gradually, reacting to give maximum chain length; then the excess is washed out. However, as shown by Example 5, the products of emulsion chain extension and solvent chain extension are chemically identical as determined by their infrared absorption spectra.

The amount of water to be employed in the formation of the emulsion is not critical, although in general the minimum amount will be equal in volume to the initial polyurethane reaction product or the solvent solution or slurry of this product. When too small an amount of water is employed, emulsions are obtained which are too thick to handle readily while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols, quaternary ammonium salts, the tertiary amine or alkylol amine salts of long chain alkyl acid sulphate esters, alkyl sulphonic acids or alkyl aryl sulphonic acids and salts thereof; and alkali metal salts of high molecular weight organic acids. Nonionic agents such as polyoxyethylenepolyoxypropylene glycols, are preferred. The pH can then be regulated to a neutral value, preferably not above 7, to minimize any tendency toward hydrolysis. Salts of the high molecular weight organic acids may be used as emulsifying agents. One method of incorporating such salts is to mix the acid, e.g., tall oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From 2% to 6% of the emulsifying agent based on the weight of the prepolymer employed will usually be found sufficient to produce stable emulsions. When a fatty acid soap is used as the emulsifying agent, the soap must not be destroyed by acidic substances. The pH must therefore be maintained at least as high as that of an aqueous solution of the soap if stable latices are to be produced. For most fatty acid soaps the pH should be at least 9, and for this reason soaps are not preferred. The small amount of carbon dioxide which may be formed by the chain extension of the isocyanate groups with water is acidic and uses up free alkali in the latex, so that an excess of alkali may be necessary to compensate for this. Preferably no alkali is added to the reaction, since some usually remains and causes deterioration of the polymer at elevated temperatures.

The chain extension step, while a relatively fast reaction when employing the piperazine chain extenders of the invention, may frequently be assisted by agitation of the emulsion for some time after its initial formation. This is usually accomplished by means of a conventional paddle type agitator at 30–90 r.p.m. or other conventional stirring equipment such as a Cowles dissolver, which aids in contacting the emulsion droplets with the chain extender.

The polymer may be coagulated from its aqueous dispersion or latex by methods normally employed in the coagulation of rubber or synthetic elastomers from their latices. Common methods for effecting this coagulation are by the addition of acid, for example, acetic acid, or inorganic salts such as sodium chloride or calcium chloride. Mere acidification is sometimes not sufficient to coagulate the more stable latices. The addition of salt in addition to acid is often desirable. Usually from twenty to thirty parts of sodium chloride per 100 parts of water in the latex will effect coagulation. When the elastomer is to be precipitated from the latex, smaller amounts or none of the dispersing agent may be used, giving an intentionally less stable latex. In these cases the latex "creams," that is, a layer of the polymer collects which may be removed as a coagulum from the top or bottom of the water layer. The latex is preferably coagulated by freezing.

The coagulated polymer when removed from the water may be dried on a heated rubber mill or other milling equipment.

The following examples are given to illustrate the invention, but are not to be construed as limiting.

EXAMPLE 1

(a) Prepolymer formation 8181 parts of urethane grade dihydric polyoxyethylenepolyoxypropylenes, having a molecular weight of about 1065, a polyoxyethylene content of about 15% by weight, and a molecular weight of the polyoxypropylene base of about 940, and 2,619 parts of tolylene diisocyanate isomers (80% of the 2,4 isomer and 20% of the 2,6 isomer) were mixed. The NCO/OH mole ratio was 2.0. The mixture was heated at 120° centigrade for three hours. At the end of this time the viscosity was 9,850 centistokes and the free isocyanate content of this prepolymer was 5.32%.

(b) Chain extension

Forty parts of toluene was dissolved in 100 parts of this isocyanate-terminated prepolymer and a solution of five parts of a surface active agent, consisting of dihydric polyoxyethylenepolyoxypropylenes having a molecular weight of about 4,120, a polyoxyethylene content of about 50% by weight, and a molecular weight of the polyoxypropylene base of about 2,050, in 100 parts of water was stirred into the prepolymer-toluene solution at a 15,000 r.p.m. stirring rate over a period of one minute. After one minute's time, a solution of 6.3 parts of 2-methylpiperazine in 25 parts of water was stirred into the prepolymer emulsion. After a short time the emulsion coagulated and a solid urethane-urea polymer separated. The polymer was washed, dried, and molded into sheets. Characteristics of this polymer are shown in Table I.

EXAMPLE 2

(a) Prepolymer formation 3278 parts of dihydric polyoxyethylenepolyoxypropylenes, having a molecular weight of about 1,065, a polyoxyethylene content of about 15% by weight, and a molecular weight of the polyoxypropylene base of about 940, were mixed with 722 parts of tolylene diisocyanate mixed isomers (80/20; 2,4/2,6). The NCO/OH mole ratio was 1.35. The mixture was heated at 120° centigrade for two hours. At the end of this time the viscosity was 38,500 centistokes and the free isocyanate content was 2.27%.

(b) Chain extension 200 parts of toluene were dissolved in 500 parts of this isocyanate-terminated prepolymer and the solution was emulsified in a solution of thirty parts of a surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 500 parts of water using agitation at 15,000 r.p.m. After one minute a solution of 13.5 parts of 2-methylpiperazine in 75 parts of water was added with stirring to produce a stable emulsion of a polyurethane-urea polymer. The characteristics of this polymer are shown in Table I.

EXAMPLE 3

(a) Prepolymer formation 4800 parts of polyoxypropylene glycol of molecular weight averaging 400 were mixed with 3200 parts of tolylene diisocyanate mixed isomers (80% 2,4- and 20% 2,6-tolylene diisocyanate). The NCO/OH mole ratio was 1.60. The mixture was heated at 100 to 110° centigrade for three hours. The prepolymer thus formed was too viscous to flow at room temperature. The free isocyanate content was 6.15%.

(b) Chain extension

Twenty parts of toluene and 35 parts of cyclohexanone were dissolved in 100 parts of this isocyanate-terminated prepolymer and the solution was emulsified in a solution of 6.6 parts of a surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 110 parts of water. Stirring at 15,000 r.p.m. was employed in this operation. After one minute a solution of 7.3 parts of 2-methylpiperazine in 25 parts of water was stirred into the emulsion. After a short time, a light-colored solid polyurethane-urea polymer separated. The polymer was washed, dried, and molded into sheets. Characteristics of this polymer are shown in Table I.

EXAMPLE 4

(a) Prepolymer formation 2910 parts of polyoxypropylene glycol of average molecular weight 1000 were mixed with 1090 parts of tolylene diisocyanate mixed isomers (80/20; 2,4/2,6). The NCO/OH mole ratio was 2.0. The mixture was heated at 120° centigrade for one hour and then at 100° centigrade for two hours. At the end of this time the viscosity of the product was 15,000 centistokes and the free isocyanate content was 6.96%.

(b) Chain extension

Twenty parts of toluene and 35 parts of cyclohexanone were dissolved in 100 parts of this isocyanate-terminated prepolymer and the solution was emulsified in a solution of three parts of a surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 100 parts of water using high speed agitation. Immediately thereafter a solution of 8.3 parts of 2-methylpiperazine was stirred in to produce a stable emulsion of a polyurethane-urea polymer. The emulsion was broken or coagulated by freezing and thawing to give the solid polymer, which was then washed, dried, and molded. Some of its properties are recorded in Table I.

EXAMPLE 5

(a) Prepolymer formation 9315 parts of polyoxypropylene glycol of average molecular weight 2000 were mixed with 1485 parts of mixed isomers (80/20; 2,4/2,6) of tolylene diisocyanate. The NCO/OH mole ratio was 1.75. The mixture was heated at 120° centigrade for three hours. The viscosity at 25° centigrade was then 10,100 centipoises and the free isocyanate content was 2.6%.

(b) Chain extension

Polyurethane-urea polymers were made from this isocyanate-terminated prepolymer by both solution and emulsion techniques.

(i) Forty parts of toluene were dissolved in 100 parts of the above isocyanate-terminated prepolymer and to this solution was added with stirring a solution of 3.1 parts of 2-methylpiperazine in 27 parts of toluene. The mixture gelled immediately. The polymer was dried and then molded into sheets.

(ii) Fourteen parts of toluene were dissolved in 35 parts of the above isocyanate-terminated prepolymer. This solution was emulsified in a solution of 1.75 parts of a surface active agent, consisting of dihydric polyoxyethylenepolyoxypropylenes having a molecular weight of about 4,120, a polyoxyethylene content of about 50% by weight, and a molecular weight of the polyoxypropylene base of about 2,050, in 35 parts of water using agitation at 15,000 r.p.m. After one minute a solution of 1.08 parts of 2-methylpiperazine in 8.75 parts of water was added to this emulsion with stirring. A stable dispersion of polyurethane-urea polymer resulted. This emulsion was coagulated by freezing and then thawing. The polymer was washed, dried, and molded into sheets.

A comparison of the infrared absorption spectra of the materials produced in (i) and (ii) showed the two materials to be chemically identical. The physical characteristics of the polyurethane-urea polymers are shown in Table I.

EXAMPLE 6

(a) Prepolymer formation 3360 parts of dihydric polyoxyethylenepolyoxypropylenes having a molecular weight of about 2,000 and a polyoxyethylene content of about 15% by weight, were mixed with 640 parts of mixed isomers of tolylene diisocyanate (80/20; 2,4/2,6). The mixture was heated at 120° centigrade for three hours. At the end of this time the viscosity was 4600 centipoises at 25° centigrade and the free isocyanate content was 4.2%.

(b) Chain extension

One hundred parts of this isocyanate-terminated prepolymer were dissolved in 650 parts of ethyl acetate and an additional 13.1 parts of tolylene diisocyanate mixed isomers were added. The NCO/OH mole ratio was 2.16. 10.8 parts of 2,3,5,6-tetramethylpiperazine was then stirred in. A stable solution of the isocyanate-terminated polyurethane-urea polymer was formed. A film of the product was dried, cured eight hours at 120° centigrade, and tested. It had a tensile strength of 3000 p.s.i. and an elongation at break of 500%.

EXAMPLE 7

(a) Prepolymer formation 3360 parts of dihydric polyoxyethylenepolyoxypropylenes having a molecular weight of about 2,000, a polyoxyethylene content of about 15% by weight, and a molecular weight of the polyoxypropylene base of about 1,750, were mixed with 640 parts of mixed isomers (80/20; 2,4/2,6) of tolylene diisocyanate. The NCO/OH mole ratio was 2.16. The mixture was heated at 120° centigrade for three hours. At the end of this time the viscosity was 4600 centipoises at 25° centigrade and the free isocyanate content was 4.2%.

(b) Chain extension (i) One hundred parts of this isocyanate-terminated prepolymer were dissolved in 100 parts of cyclohexanone and the solution emulsified in 200 parts of water containing four parts of surface active agent, consisting of dihydric polyoxyethylenepolyoxypropylenes having a molecular weight of about 6,760, a polyoxyethylene content of about 70% by weight, and a molecular weight of the polyoxypropylene base of about 2,050. After one minute a solution of 5.7 parts of cis 2,5-dimethylpiperazine was added with stirring to produce a stable emulsion of the polyurethane-urea polymer. The emulsion was coagulated by freezing and thawing and the polymer was filtered off, washed, dried, and molded. The polymer was soft, light-colored, and could be milled easily on a rubber mill.

(ii) One hundred parts of the above isocyanate-terminated prepolymer were dissolved in 100 parts of isopropyl acetate and the solution emulsified in 200 parts of water containing four parts of the surface active agent employed in (i) above. After one minute a solution of 5.7 parts of trans 2,5-dimethylpiperazine was added with stirring to produce a stable emulsion of the polyurethane-urea polymer. The emulsion was coagulated by freezing and thawing and the polymer was filtered off, washed, dried, and molded. The product was a light-colored rubber, harder than that produced using cis 2,5-dimethylpiperazine, and did not mill as easily on a rubber mill. Characteristics of the polymer are shown in Table I.

EXAMPLE 8

(a) Prepolymer formation (see Example 7)

(b) Chain extension

One hundred parts of the prepolymer described in Example 7 and 5.7 parts of 2,6-dimethylpiperazine were separately dissolved in portions of 650 parts of ethyl acetate. The two solutions were mixed and 8.7 parts of mixed isomers of tolylene diisocyanate (80/20; 2,4/2,6) were added with stirring. A stable solution of the thus-produced polyurethane-urea was formed. The solution was dried and cured sixteen hours at 120° centigrade and the resulting film was tested. Results are shown in Table I.

EXAMPLE 9.—(COMPARATIVE EXAMPLE)

(a) Prepolymer formation 3030 parts of urethane grade dihydric polyoxyethylene-polyoxypropylenes, having a molecular weight of about 1,065, a polyoxyethylene content of about 15% by weight, and a molecular weight of the polyoxypropylene base of about 940, and 970 parts of tolylene diisocyanate isomers (80/20; 2,4/2,6) were mixed. The NCO/OH mole ratio was 2.0. The mixture was heated at 120° centigrade for two and one-half hours. At the end of this time the viscosity was 9000 centipoises at 25° centigrade and the free isocyanate content was 5.38%.

(b) Chain extension 5.78 parts of 1,4-butanediol were mixed with 100 parts of this isocyanate-terminated prepolymer. The mixture was poured into a tray and heated at 70° centigrade for 24 hours. A soft millable polyurethane rubber was obtained. Some characteristics of this material are shown in Table I.

EXAMPLE 10

(a) Prepolymer formation 7475 parts of urethane grade dihydric polyoxyethylene-polyoxypropylenes, having a molecular weight of about 1,065, a polyoxyethylene content of about 15% by weight, and a molecular weight of the polyoxypropylene base of about 940, and 2393 parts of tolylene diisocyanate isomers (80/20; 2,4/2,6) were mixed. The NCO/OH mole ratio was 2.0. The mixture was then heated at 120° centigrade for three hours. At the end of this time the free isocyanate content was 5.37%.

(b) Chain extension 100 parts of this isocyanate-terminated prepolymer was dissolved in forty parts of toluene and the solution emulsified in a solution of six parts of surface active agent, consisting of dihydric polyoxyethylenepolyoxypropylenes, having a molecular weight of about 10,000, a polyoxyethylene content of about 80% by weight, and a molecular weight of the polyoxypropylene base of about 2,250, in 100 parts of water. After one minute, a solution of 5.5 parts of piperazine in 25 parts of water was added to the emulsion with stirring. A stable suspension of polyurethane-urea polymer resulted. The characteristics of this material are shown in Table I.

EXAMPLE 11.—POLYESTER POLYURETHANE PREPOLYMER

(a) Prepolymer formation

A polyester was made following the formulation and procedure given by N. Seeger in U.S. Patent 2,760,953 assigned to Goodyear Tire and Rubber Company.

| | Parts |
|---|---|
| Adipic acid | 2630 |
| Ethylene glycol | 769 |
| Propylene glycol | 650 |
| | 4049 |

The mixture was heated to 200° centigrade. Then the pressure was reduced gradually to twenty millimeters of mercury and the reaction continued until an acid number of 1.4 was reached. The product was of a tar-like consistency and a had a molecular weight of 1875.

883 parts of this polyester was mixed with 117 parts of tolylene diisocyanate (80/20; 2,4/2,6) mixed isomers. The NCO/OH mole ratio was 1.50. The mixture was heated at 120° centigrade for three hours, at the end of which time the free isocyanate content was 1.54%.

(b) Chain extension 100 parts of this isocyanate-terminated polyurethane prepolymer was dissolved in sixty parts of toluene and the solution was emulsified in a solution of six parts of surface active agent, consisting of dihydric polyoxyethylene-polyoxypropylenes having a molecular weight of about 10,000, a polyoxyethylene content of about 80% by weight, and a molecular weight of the polyoxypropylene base of about 2,250, in 100 parts of water. After one minute a solution of 1.8 parts of 2-methylpiperazine in 25 parts of water was added to the emulsion with stirring. A stable emulsion resulted which was coagulated by freezing and thawing. The polymer was separated, dried and molded into sheets. The characteristics of this polymer are shown in Table I.

EXAMPLE 12.—COMPARATIVE EXAMPLE

(a) Prepolymer formation 4800 parts of polyoxypropylene glycol of average molecular weight 400 was mixed with 3200 parts of mixed isomers (80/20; 2,4/2,6) of tolylene diisocyanate. The NCO/OH ratio was 1.6. The mixture was heated at 100 to 110° centigrade for three hours. At the end of this time the isocyanate content of the polyurethane prepolymer was 6.15%.

(b) Chain extension 100 parts of this isocyanate-terminated prepolymer was mixed with 6.6 parts of 1,4-butanediol and sixty parts of toluene. The mixture was heated eighteen hours at 70° centigrade. After removing the toluene a soft rubber was obtained, the properties of which are shown in Table I.

EXAMPLE 13.—COMPARATIVE EXAMPLE

(a) Prepolymer formation (see Example 11)

(b) Chain extension 100 parts of the polyester type isocyanate-terminated prepolymer described in Example 11 was mixed with sixty parts of toluene and 1.65 parts of 1,4-butanediol. The solution was poured into a tray and heated for eighteen hours at 70° centigrade and then for three hours at 120° centigrade. The dry resulting product was soft and sticky and of a tar-like consistency.

EXAMPLE 14.—COMPARATIVE EXAMPLE

(a) Prepolymer formation 9315 parts of polyoxypropylene glycol of average molecular weight 200 were mixed with 1485 parts of mixed isomers (80/20; 2,4/2,6) of tolylene diisocyanate. The NCO/OH mole ratio was 1.75. The mixture was heated at 120° centigrade for four hours and fifteen minutes. The viscosity at 25° centigrade was then 10,100 centipoises and the free isocyanate content was 2.6%.

(b) Chain extension 100 parts of this isocyanate-terminated liquid polyurethane prepolymer was emulsified in a solution of eight parts of surface active agent, consisting of dihydric polyoxyethylenepolyoxypropylenes having a molecular weight of about 10,000, a polyoxpethylene content of about 80% by weight, and a molecular weight of the polyoxypropylene base of about 2,250, in forty parts of water using agitation at 15,000 r.p.m. to effect emulsification. Within one minute a solution of 3.75 parts of 2,4-tolylene diamine in fifteen parts of water was added to the emulsion. A partially stable emulsion of polyurethane-urea polymer was formed which was coagulated by freezing and thawing. The product was separated, washed, dried, and molded into sheets. Characteristics of this polymer are shown in Table I.

EXAMPLE 15.—COMPARATIVE EXAMPLE

(a) Prepolymer formation 3030 parts of dihydric polyoxyethylenepolyoxpropylenes having a molecular weight of about 1,065, a polyoxyethylene content of about 15% by weight, and a molecular weight of the polyoxypropylene base of about 940, were mixed with 970 parts of mixed isomers (80/20; 2,4/2,6) of tolylene diisocyanate. The NCO/OH mole ratio was 2.0. The mixture was heated at 120° centigrade for three hours. The viscosity at 25° centigrade was then 9,000 centipoises and the free isocyanate content was 5.38%.

(b) Chain extension 100 parts of this isocyanate-terminated liquid polyurethane prepolymer were dissolved in 150 parts of isopropyl acetate. To this solution was added a solution of fifteen parts of surface active agent, consisting of dihydric polyoxythylenepolyoxypropylenes having a molecular weight of about 10,000, a polyoxyethylene content of about 80% by weight, and a molecular weight of the polyoxypropylene base of about 2,250, in 250 parts of water with agitation at 15,000 r.p.m. An inversion of phase occurred and an emulsion formed of prepolymer solution in water. Within one minute, a solution of 7.8 parts of 2,4-tolylene diamine in 42.2 parts of isopropyl acetate were added to the emulsion. A stable emulsion of polyurethane-urea polymer was formed which was coagulated by freezing and thawing. The polymer was separated, washed, dried, and molded into sheets. Characteristics of this polymer are shown in Table I.

EXAMPLE 16.—COMPARATIVE EXAMPLE

(a) Prepolymer formation 4800 parts of polyoxypropylene glycol of average molecular weight 400 was mixed with 3200 parts of mixed isomers of tolylene diisocyanate (80/20; 2,4/2,6) and the mixture heated at 100 to 110° centigrade for three hours. The NCO/OH mole ratio was 1.6. At the end of this time, the free isocyanate content was 6.15%.

(b) Chain extension 100 parts of this isocyanate-terminated semi-solid polyurethane prepolymer was dissolved in twenty parts of toluene and 35 parts of cyclohexanone. The solution was emulsified in a solution of 6.6 parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 110 parts of water using agitation at 15,000 r.p.m. Within one minute, a solution of 8.9 parts of 2,4-tolylene diamine in 25 parts of water were added and a stable emulsion of polyurethane-urea polymer resulted. The emulsion was coagulated by freezing and thawing. The polymer was separated, washed, dried, and molded into sheets. Characteristics of this polymer are shown in Table I.

TABLE I.—PROPERTIES OF SOME POLYURETHANE-UREA POLYMERS

| Example | 1 | 2 | 3(e) | 4(d) | 5i | 5ii | 6 | 7i | 7ii | 8 |
|---|---|---|---|---|---|---|---|---|---|---|
| Diol | L31 | L31 | PPG 400 | PPG 1000 | PPG 2000 | PPG 2000 | L61 | L61 | L61 | L61. |
| NCO/OH Mole Ratio | 2.00 | 1.35 | 1.60 | 2.00 | 1.75 | 1.75 | | See Examples. | | |
| Free NCO Content of Prepolymer, percent | 5.32 | 2.27 | 6.15 | 6.96 | 2.6 | 2.6 | | | | |
| Extending Agent | 2-MP | 2-MP | 2-MP | 2-MP | 2-MP | 2-MP | 2,3,5,6-TMP. | Cis 2,5-DMP. | Trans 2,5-DMP. | 2,6-DMP. |
| Shore A Hardness, 5″ | 61 | 40 | 98 | 70 | 43 | 38 | Soft millable rubber (softer than 7ii) | | | |
| Tensile Strength, p.s.i. | 3,780 | 680 | 7,080 | 4,450 | 630 | 830 | 3,000 | | 2,120 | 1,340. |
| Elongation at Break, percent | 1,550 | 2,300 | 240 | 710 | 1,500 | 2,000 | 500 | | 320 | 400. |
| Stress at 300% Elongation, p.s.i. | 500 | 110 | | 1,370 | 150 | 130 | | | 2,100 | 975. |
| Yield Point, p.s.i. | | | 4,950 | | | | | | | |

| Example | 9(a)(b) | 10 | 11 | 12(a)(c) | 13(a)(f) | 14(g) | 15(h) | 16(i) |
|---|---|---|---|---|---|---|---|---|
| Diol | L31 | L31 | PE | PPG 400 | PE | PPG 2000 | L31 | PPG 400. |
| NCO/OH Mole Ratio | 2.00 | 2.0 | 1.50 | 1.60 | 1.50 | 1.75 | 2.00 | 1.60. |
| Free NCO Content of Prepolymer, percent | 5.38 | 5.37 | 1.54 | 6.15 | 1.54 | 2.6 | 5.38 | 6.15. |
| Extending Agent | 1,4-butanediol. | Pip | 2-MP | 1,4-butanediol. | 1-4,butanediol. | TDA | TDA | TDA. |
| Shore A Hardness, 5″ | 36 | 62 | 51 | 22 | TAR | 56 | 77 | 99. |
| Tensile Strength, p.s.i. | 370 | 3,070 | 2,080 | 250 | | 470 | 2,220 | 5,000. |
| Elongation At Break, percent | 1,500 | 440 | 900 | 1,900 | | 1,090 | 1,160 | 85. |
| Stress at 300% Elongation, p.s.i. | 160 | 890 | Low | 140 | | 360 | 1,000 | |
| Yield Point, p.s.i. | | | | | | | | 7,730. |

(a) = straight polyurethane polymer.
(b) = comparison with Example 1.
(c) = comparison with Example 3.
(d) = excellent properties for an unvulcanized rubber.
(e) = plastic—note yield point.
(f) = comparison with Example 11.
(g) = comparison with Example 5ii.
(h) = comparison with Examples 1 and 9.
(i) = comparison with Examples 3 and 12.

Pip = Piperazine.
2-MP = 2-Methylpiperazine.
cis 2,5-DMP = cis 2,5-Dimethylpiperazine.
trans 2,5-DMP = trans 2,5-Dimethylpiperazine.
2,6-DMP = 2,6-Dimethylpiperazine.
2,3,5,6-TMP = 2,3,5,6-Tetramethylpiperazine.
TDA = 2,4-Tolylene diamine.

PPG 400 = polyoxypropylene glycol, M.W. 400.
PPG 1000 = polyoxypropylene glycol, M.W. 1,000.
PPG 2000 = polyoxypropylene glycol, M.W. 2,000.
L31 = polyoxyethylenepolyoxypropyleneglycol, M.W. 1,065, polyoxyethylene content 15%.
L61 = polyoxyethylenepolyoxypropylene glycol, M.W. 2,000.
PE = polypropylene glycol polyethylene glycol adipate, M.W. 1,875.

EXAMPLE 17.—COMPARATIVE EXAMPLE—POLYOXYALKYLENE GLYCOL (a) *Prepolymer formation*

2750 parts of polyoxypropylene glycol of average molecular weight 765 were mixed with 1250 parts of mixed isomers of tolylene diisocyanate (80/20; 2,4/2,6) and the mixture was heated at 100° centigrade for three hours. The NCO/OH ratio was 2.0/1. At the end of this time, the viscosity at 25° centigrade was 37,000 centipoises and the isocyanate content was 7.12%.

(b) *Chain extension*

100 parts of this isocyanate-terminated urethane prepolymer were dissolved in twenty parts of toluene and thirty-five parts of cyclohexanone. The solution was emulsified in a solution of six parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 110 parts of water using agitation at 15,000 r.p.m. To the emulsion there was added within one minute's time a solution of 10.4 parts of 2,4-tolylenediamine in 25 parts of water. A urethane-urea polymer was formed which was washed, dried and molded into sheets. Some properties of this polyurethane-urea polymer are shown in Table II.

EXAMPLE 18.—POLYOXYALKYLENE GLYCOL (a) *Prepolymer formation*

See Example 17 for prepolymer formation.

(b) *Chain extension*

100 parts of the isocyanate-terminated urethane prepolymer prepared as in Example 17 were dissolved in forty parts of toluene. To this solution there was added with agitation at 15,000 r.p.m. a solution of six parts of surface active agent, consisting of dihydric polyoxyethylenepolyoxypropylenes having a molecular weight of about 10,000, a polyoxyethylene content of about 80% by weight, and a molecular weight of the polyoxypropylene base of about 2,250, in 100 parts of water. An inversion of phase occurred and an emulsion of prepolymer solution in water was formed. To the emulsion, within one minute after its preparation, a solution of 8.5 parts of 2-methylpiperazines in 25 parts of water was added. An emulsion of urethane-urea polymer was formed which was coagulated by freezing and thawing. The polymer was separated, washed, dried, and molded into sheets. Some properties of this polyurethane-urea polymer are shown in Table II.

TABLE II.—COMPARISON OF URETHANE-UREA POLYMERS PREPARED FROM TDA AND 2-MP

|  | (1) | (2) | (3) | (4) | (5) | (6) | (7) |
|---|---|---|---|---|---|---|---|
| Glycol | L61 | L31 | L31 | 2000+ | 765** | 765** | 400* |
| NCO/OH Ratio | 2.00 | 2.00 | 1.35 | 1.75 | 2.00 | 1.75 | 1.60 |
| Extending Agent: |  |  |  |  |  |  |  |
| TDA: |  |  |  |  |  |  |  |
| Shore A Hardness, 5″ | 65 | 77 | 46 | 56 | 91 | 86 | 99 |
| Tensile Strength, p.s.i | 850 | 2,280 | 460 | 470 | 3,670 | 4,290 | 5,000 |
| Elongation at Break, percent | 1,160 | 1,160 | 1,380 | 1,090 | 370 | 735 | 85 |
| Stress at 300% Elong., p.s.i | 505 | 1,000 | 230 | 360 | 3,100 | 1,930 |  |
| Yield Point, p.s.i |  |  |  |  |  |  | 7,730 |
| 2-MP: |  |  |  |  |  |  |  |
| Shore A Hardness, 5″ | 44 | 61 | 40 | 38 | 88 | 75 | 98 |
| Tensile Strength, p.s.i | 700 | 3,780 | 680 | 830 | 6,590 | 6,950 | 7,080 |
| Elongation at Break, percent | 2,500 | 1,550 | 2,300 | 2,000 | 620 | 815 | 240 |
| Stress at 300% Elong., p.s.i | 120 | 500 | 110 | 130 | 2,850 | 1,220 |  |
| Yield Point, p.s.i |  |  |  |  |  |  | 4,950 |

The above data are on raw, unfilled, unvulcanized stocks pulled at a jaw speed of twenty inches per minute except for the polymers prepared from PPG 400 which were pulled at a jaw speed of one inch per minute.

TDA=Tolylene diamine.
2MP=2-Methylpiperazine.
L31=polyoxyethylenepolyoxypropylene glycol, M.W. 1,065, polyoxyethylene content 15%.
L61=polyoxyethylenepolyoxypropylene glycol, M.W. 2,000.
*PPG 400=polyoxypropylene glycol, M.W. 400.
**PPG 765=polyoxypropylene glycol, M.W. 765.
+PPG 2000=polyoxypropylene glycol, M.W. 2,000.
(1) Two new Examples.
(2) Example 15 vs. Example 1.
(3) New Example vs. Example 2.
(4) Example 14 vs. Example 5ii.
(5) Example 17 vs. Example 18.
(6) Two new Examples.
(7) Example 16 vs. Example 3.

Examples 17 and 18 and Table II, which in itself presents five additional examples therein identified (which for procedure followed the details of Examples 17 and 18), clearly show for the piperazine-extended polyurethanes of the present invention either better processability at tensile strength values equal to those of the tolylene diamine-extended polyurethanes or that, at equal hardness values, the piperazine-extended polyurethanes have greater tensile strength. Likewise, the comparisons of Table I indicate the superiority of the polyurethane-ureas of the present invention. The same contrast exists when comparison is made between polyurethanes extended with other primary diamines and the piperazine-extended polyurethanes of the present invention.

The following Tables III and IIIA show further comparisons of tensile strength and hardness values between products of the present invention and polyurethanes extended with other diamines.

TABLE III.—HARDNESS AND TENSILE STRENGTH VALUES FOR POLYURETHANES EXTENDED WITH OTHER DIAMINES

|  | Example No. | Prepolymer Composition and NCO/OH Ratio | Extending Agent | Shore A Hardness 5″ | Tensile Strength, p.s.i. |
|---|---|---|---|---|---|
| 1 |  | L81-TDI; 2.00/1 | TDA | 40 | 320 |
| 2 | Table II (3) | L31-TDI; 1.35/1 | TDA | 46 | 460 |
| 3 |  | PPG 2000-TDI; 1.62/1 | TDA | 50 | 380 |
| 4 |  | PPG 2000-TDI; 1.75/1 | m-Phenylene diamine | 51 | 670 |
| 5 | 14 | PPG 2000-TDI; 1.75/1 | TDA | 56 | 470 |
| 6 |  | L61-TDI; 2.00/1 | HMDA | 62 | 1,020 |
| 7 |  | PPG 2000-TDI; 1.75/1 | m-Xylylene diamine | 64 | 1,340 |
| 8 | Table II (1) | L61-TDI; 2.00/1 | TDA | 65 | 850 |
| 9 |  | L61-TDI; 2.00/1 | DPM DA | 66 | 1,130 |
| 10 |  | PPG 2000-TDI; 2.00/1 | TDA | 72 | 1,230 |
| 11 |  | L61-DADI; 2.00/1 | Dianisidine | 75 | 2,230 |
| 12 | 15 | L31-TDI; 2.00/1 | TDA | 77 | 2,280 |
| 13 | Table II (6) | PPG 765-TDI; 1.75/1 | TDA | 86 | 4,290 |
| 14 | 17 | PPG 765-TDI; 2.00/1 | TDA | 91 | 3,670 |
| 15 | 16 | PPG 400-TDI; 1.60/1 | TDA | 99 | 5,000 |

TDI is Tolylene diisocyanate.
DADI is dianisidine diisocyanate.
HMDA is hexamethylenediamine.
DPM DA is diphenylmethanediamine.
Other abbreviations are as shown in the preceding tables.

TABLE IIIA.—HARDNESS AND TENSILE STRENGTH VALUES FOR REPRESENTATIVE PIPERAZINE-EXTENDED POLYURETHANES

|  | Example No. | Prepolymer Composition | Extending Agent | Shore A Hardness 5″ | Tensile Strength, p.s.i. |
|---|---|---|---|---|---|
| 1 |  | L61-TDI; 1.75/1 | 2-MP | 32 | 700 |
| 2 | 5ii | PPG 2000-TDI; 1.75/1 | 2-MP | 38 | 830 |
| 3 | 2 | L31-TDI; 1.35/1 | 2-MP | 40 | 680 |
| 4 | Table II (1) | L61-TDI; 2.00/1 | 2-MP | 44 | 700 |
| 5 |  | L31-TDI; 1.75/1 | 2-MP | 54 | 2,300 |
| 6 | 1 | L31-TDI; 2.00/1 | 2-MP | 61 | 3,780 |
| 7 | 10 | L31-TDI; 2.00/1 | Piperazine | 62 | 3,070 |
| 8 | 4 | PPG 1000-TDI; 2.00/1 | 2-MP | 70 | 4,450 |

Abbreviations are as shown in the preceding tables.

Curing and compounding

Although, as noted previously, many of the piperazine modified polyurethane-ureas of the present invention are characterized by sufficiently high tensile strength so as not to require vulcanization or cross-linking, where such is desired, they may be cured, for example, by milling into the polymer an organic polyisocyanate such as mentioned previously, or e.g., 2,4-tolylene diisocyanate dimer or N,N'-bis(3-isocyanato-4-methylphenyl)urea, in a ratio of from two to eight parts per 100 parts of polymer while it is being worked on a rubber mill at temperatures of less than 100° centigrade, and then curing the mixture by molding and heating to from 100° to 150° centigrade for from fifteen to sixty minutes. Other curing agents which may be used are tetrachloroquinone, paraformaldehyde, organic peroxides, and the like. Still other methods of effecting a cure are available and will be apparent to one skilled in the art.

The elastomers prepared according to the present invention may be used for the same purposes as other elastomers. They may be molded and shaped and from them may be prepared such articles as tires, inner tubes, belts, hose and tubes, wire and cable jackets, footwear, sponge, coated fabric and various other molded or dipped articles. They may be processed to give thermoplastic or thermosetting coatings, molded articles, or films.

The basic elastomeric properties of these products may be varied, if desired, by suitable compounding. The type and amount of the compounding agent to be used is dependent upon the use for which the elastomer is intended. Some of the more important compounding agents which are of value with these elastomers, especially those based on polyether glycols, are carbon black, clay, silica, talc, zinc and magnesium oxides, titanium dioxide and tetraalkoxides, and plasticizers. Inorganic and organic coloring agents may be incorporated to give well defined colored products. The natural color of the elastomers is off-white to a pale yellow.

The compounding agents may be mixed or incorporated with the product at the same time that polyisocyanate vulcanizing agents are added, if desired. Conventional rubber processing machinery may be used. The resulting compounded stocks may be shaped or cured in conventional rubber industry equipment. Alternatively the stocks may be dissolved or extended with solvents for application to surfaces upon which they may be cured after evaporation of the solvent.

It is to be understood that the invention is not to be limited to the exact details of operation or exact compounds shown and described, as obvious modifications and equivalents will be apparent to one skilled in the art, and the invention is therefore to be limited only by the scope of the appended claim.

I claim:

1. A process for the preparation of polyurethane-urea polymers containing urea-linked C-lower alkylpiperazine radicals which comprises:
   (a) reacting a polyester glycol of the formula:

$$HO-(Z-O-CO-Z'-CO-O)_n-Z-OH$$

wherein Z and Z' are hydrocarbon radicals and $n$ is an integer such that the molecular weight of said glycol is at least 750, with a stoichiometric excess of an organic polyisocyanate whereby an isocyanate-terminated polyurethane polymer is obtained;
   (b) emulsifying said polyurethane polymer in water in the presence of an emulsifying agent, and
   (c) chain extending said emulsified polyurethane polymer with from about 0.5 to 1.5 equivalents for each equivalent of said polyurethane polymer of a C-lower alkylpiperazine.

References Cited by the Examiner
UNITED STATES PATENTS

| | | | |
|---|---|---|---|
| 2,929,803 | 3/1960 | Frazer | 260—77.5 |
| 2,975,157 | 3/1961 | Katz | 260—77.5 |
| 2,988,538 | 6/1961 | Thomas | 260—77.5 |

LEON J. BERCOVITZ, *Primary Examiner.*

M. C. JACOBS, *Assistant Examiner.*